(12) United States Patent
Kiely

(10) Patent No.: US 6,444,907 B1
(45) Date of Patent: Sep. 3, 2002

(54) ELECTRICAL CABLE CONNECTOR

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 09/846,954

(22) Filed: May 1, 2001

(51) Int. Cl.$^7$ ................................ H02G 3/18
(52) U.S. Cl. ................ 174/65 R; 174/64; 248/56; 16/2.2; 439/604
(58) Field of Search .................. 174/64, 65 G, 174/65 R, 65 SS, 153 G, 153 R, 152 G, 151, 31 R, 35 GC, 35 R, 91; 248/56; 16/2.1, 2.2; 439/471, 604

(56) References Cited

U.S. PATENT DOCUMENTS

| | | | |
|---|---|---|---|
| 1,316,218 A | * | 9/1919 | Bloomer |
| 2,458,409 A | | 1/1949 | Paige |
| 3,369,071 A | | 2/1968 | Tuisku |
| 3,567,843 A | | 3/1971 | Collins et al. |
| 3,746,373 A | | 7/1973 | Prudente |
| 3,858,151 A | | 12/1974 | Paskert |
| 3,904,812 A | | 9/1975 | Daffron |
| 3,980,325 A | | 9/1976 | Robertson |
| 4,012,578 A | | 3/1977 | Moran et al. |
| 4,022,966 A | | 5/1977 | Gajajiva |
| 4,156,103 A | | 5/1979 | Dola et al. |
| 4,198,537 A | | 4/1980 | Mariani |
| 4,468,535 A | | 8/1984 | Law |
| 4,490,576 A | | 12/1984 | Bolante et al. |
| 4,494,779 A | | 1/1985 | Neff et al. |
| 4,547,623 A | * | 10/1985 | Van Brunt et al. ........ 174/35 R |
| 4,549,755 A | | 10/1985 | Kot et al. |
| 4,619,332 A | | 10/1986 | Sheehan |
| 4,711,472 A | | 12/1987 | Schnell |
| 4,739,126 A | | 4/1988 | Gutter et al. |
| 4,773,280 A | | 9/1988 | Baumgarten |
| 4,836,580 A | | 6/1989 | Farrell |
| 4,880,387 A | | 11/1989 | Stikeleather et al. |
| 4,885,429 A | | 12/1989 | Schnittker |
| 4,990,721 A | | 2/1991 | Sheehan |
| 5,068,496 A | | 11/1991 | Favalora |
| 5,072,072 A | | 12/1991 | Bawa et al. |
| 5,132,493 A | | 7/1992 | Sheehan |
| 5,200,575 A | | 4/1993 | Sheehan |
| 5,208,437 A | * | 5/1993 | Couto et al. ............ 174/65 SS |
| 5,266,050 A | | 11/1993 | O'Neil et al. |
| 5,373,106 A | | 12/1994 | O'Neil et al. |
| 5,422,437 A | | 6/1995 | Schnell |
| 6,025,557 A | * | 2/2000 | Daoud ................ 174/65 G |
| 6,034,325 A | * | 3/2000 | Holtel et al. ............ 174/59 |
| 6,043,432 A | | 3/2000 | Gretz |

* cited by examiner

Primary Examiner—Dean A. Reichard
Assistant Examiner—Dhiru R Patel
(74) Attorney, Agent, or Firm—Melvin I. Stoltz

(57) ABSTRACT

By providing two integrated components, an outer housing and an inner sleeve member, with the inner sleeve member being securely mounted to the outer housing in a manner which prevents its separation from the housing, an efficient, easily manufactured and assembled cable connector is realized.

In the preferred embodiment, the inner sleeve member is press fitted into the housing in order to provide the desired secure, integrated affixation of these components. Furthermore, the inner sleeve member is constructed in a generally hollow cylindrical shape with at least two arm members integrally formed therewith, each of which angularly slopes inwardly from the cylindrical wall of the sleeve member, and includes a distal end portion which is angularly disposed relative to the arm member in at least one direction and preferably in two directions.

22 Claims, 11 Drawing Sheets

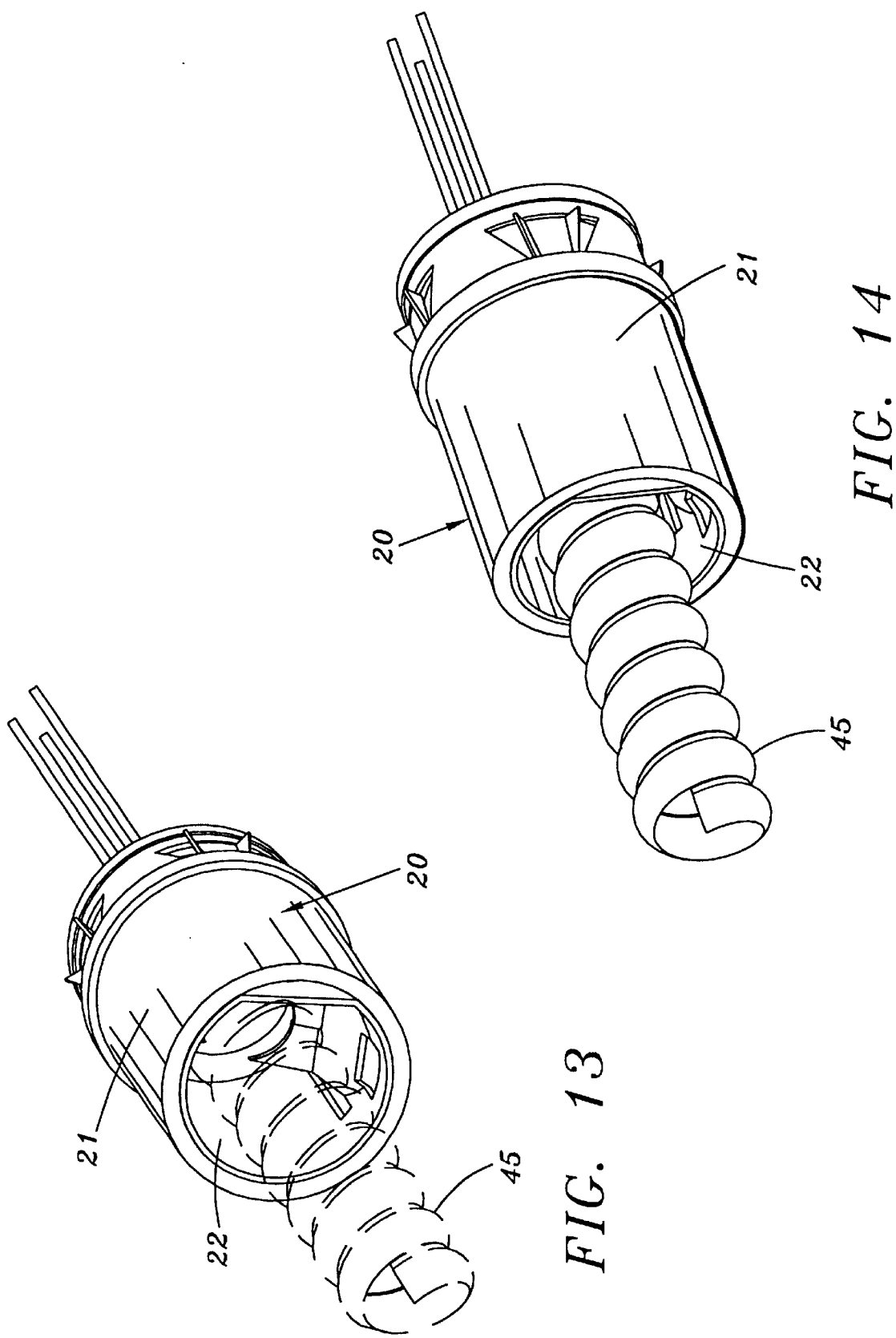

ELECTRICAL CABLE CONNECTOR

TECHNICAL FIELD

This invention relates to electrical connectors, and more particularly, to electrical connectors constructed for securing metal sheath cables to junction boxes and/or outlet boxes.

BACKGROUND ART

In the field of wiring homes and buildings, whether for new construction or for improvements or expansion, substantial development and product improvements have been made. Typically, these improvements are directed to enabling installers to securely mount any desired wiring in any desired location in the most efficient and quickest manner.

In any particular installation or location, various cables must be interconnected to each other as well as connected to the primary power supply in a suitable power distributing junction box or fuse box. In each of these instances, metal sheath cables, within which the electric power carrying wires are contained, must be securely mounted to the housing of the junction box or outlet box, or connected to appropriate devices, in a protected area.

In order to enable installers to securely mount metal sheath cables to any desired junction box or outlet box, numerous prior art connectors have been developed. However, in spite of the substantial effort that has been expended in developing such connectors, these prior art systems all have drawbacks or difficulties which prevent their universal adoption and use.

In general, the industry has long sought to have a single cable connector which is quickly and easily secured to the end of the metal sheath cable and, once installed, is capable of preventing unwanted movement or dislodgement of the cable from the connector. In addition, the cable connector, with the cable secured therein, must be quickly mountable in secure engagement with any desired junction box or outlet box. Finally, all of these attributes must be achieved in a connector which is inexpensive, in order to enable its acceptance, use, and wide-spread adoption.

Although many prior art connectors have been developed which provide one or more of the attributes detailed above, no prior art connector has been developed which is capable of satisfying all of these long-sought requirements. Consequently, a long-felt need continues to exist for a cable connector meeting these requirements.

Therefore, it is a principal object of the present invention to provide a connector for use with metal sheath cables which provides secure, rapid engagement and retention of the cable in the connector.

Another object of the present invention is to provide a cable connector having the characteristic features described above which is also quickly and easily secured to any desired junction box or outlet box in a manner which assures secure retained engagement therewith.

Another object of the present invention is to provide a cable connector having the characteristic features described above wherein the cable, once mounted to the connector, is incapable of dislodgement or withdrawal.

Another object of the present invention is to provide a cable connector having the characteristic features described above wherein the cable connector is capable of being produced and assembled quickly and easily, thereby providing an inexpensive product.

Other and more specific objects will in part be obvious and will in part appear hereinafter.

SUMMARY OF THE INVENTION

By employing the present invention, all of the difficulties and drawbacks of the prior art systems have been overcome, and an efficient, easily manufactured and assembled cable connector is realized. Furthermore, using the cable connector of the present invention, any desired metal sheath cable is quickly and easily secured to the connector and mounted in place, with complete assurance that the unwanted movement or withdrawal of the cable from the connector is virtually eliminated.

In its preferred embodiment, the cable connector of the present invention comprises two integrated components, an outer housing and an inner sleeve member. As detailed herein, the inner sleeve member is securely mounted to the outer housing in a manner which prevents its separation from the housing. As is more fully detailed below, the inner sleeve member is preferably press fitted into the housing in order to provide the desired secure, integrated affixation of these components. However, if desired, other securement methods well known in the industry may also be used.

Preferably, the outer housing comprises a generally hollow cylindrical shape constructed with two spaced, co-axial, radially extending flanges formed on the outer surface thereof, directly adjacent one end of the housing. The spaced distance between the flanges is constructed to enable well known locking rings to be mounted and retained therebetween. Although numerous locking rings are found in the prior art, one such ring is taught in Pratesi U.S. Pat. Nos. 5,189,258 and 5,342,994.

Typically, a locking ring is mounted between the radially extended flanges, with the flange spaced away from the end of the housing comprising a larger diameter than the other. With the locking ring mounted in place, the housing is able to be quickly and easily affixed to any receiving hole in any desired junction box or outlet box for secure, mounted engagement therewith.

In the preferred embodiment, the inner sleeve member is constructed in a generally hollow cylindrical shape with at least two arm members integrally formed therewith, each of which angularly slopes inwardly from the cylindrical wall of the sleeve member. In addition, each arm member comprises a distal end portion which is angularly disposed relative to the arm member in at least one direction and preferably in two directions. Finally, in the preferred embodiment, each distal end portion is split in two sections and terminates with an arcuately curved terminating end.

By employing this construction, with the angular relationships detailed below, each arm member is able to be pivoted in a first direction out of the travel paths of the cable when the sheath cable is inserted therein. In this way, the cable is able to be quickly and easily advanced through the sleeve member. However, once the sheath cable has been fully advanced into the sleeve member, the arm members return to their original position and become securely engaged wit the outer wall of the sheath cable, preventing the cable from being removed or withdrawn from the sleeve member.

Furthermore, by employing the preferred embodiment of the present invention, the arcuate curved end of each arm member fully engages the outer surface of the cable throughout the entire width of the arm member. In addition, as stated above in the preferred embodiment, the distal end portion of each arm member may be split or bifurcated into two separate finger members, with each finger member preferably comprising two separate and independent angular relationships relative to the major portion of the arm member.

By employing this construction, the distal end portions of the arm members are both pitched and sloped, relative to the major portion of the arm member, providing secure, locking engagement with the cable in a plurality of positions.

By designing the slope and/or pitch angles to be substantially equivalent to the slope of the spiral juncture of the metal on the metal sheath cable, each finger of each arm member of the inner sleeve member engages the metal sheath cable directly along the juncture between the metal section, which is defined by the narrow portion or minor diameter of the cable. In this way, secure movefree engagement of the cable is realized and movement of the sheath cable relative to the sleeve member is prevented. Furthermore, by combining the slope and/or pitch angles with an arcuately curved end which matches the curvature of the cable, secure engagement of each finger of each arm member with the cable throughout the entire width of the arm member is achieved.

If desired, the two arm members may be formed at different positions along the axial length of the sleeve member. In this way, the cable engaging end of each arm member interconnects with the metal sheath cable at different longitudinal spaced locations along the length of the cable.

By constructing the inner sleeve member in the preferred manner, each arm member is able to engage the minor diameter of the spiral shaped juncture between the metal portions of the cable. In this way, secure engagement with the optimum area of the cable is provided and completely controlled movement-free securement of the cable by the inner sleeve is achieved.

The invention accordingly comprises an article of manufacture possessing the features, properties, and the relation of elements which will be exemplified in the article herewith described, and the scope of the invention will be indicated in the claims.

THE DRAWINGS

For a fuller understanding of the nature and objects of the invention, reference should be had to the following detailed description taken in connection with the accompanying drawings, in which:

FIGS. 13 and 14 are perspective views of this embodiment of the fully assembled electrical cable connector with an electrical cable depicted therein;

DETAILED DESCRIPTION

Figure 1:
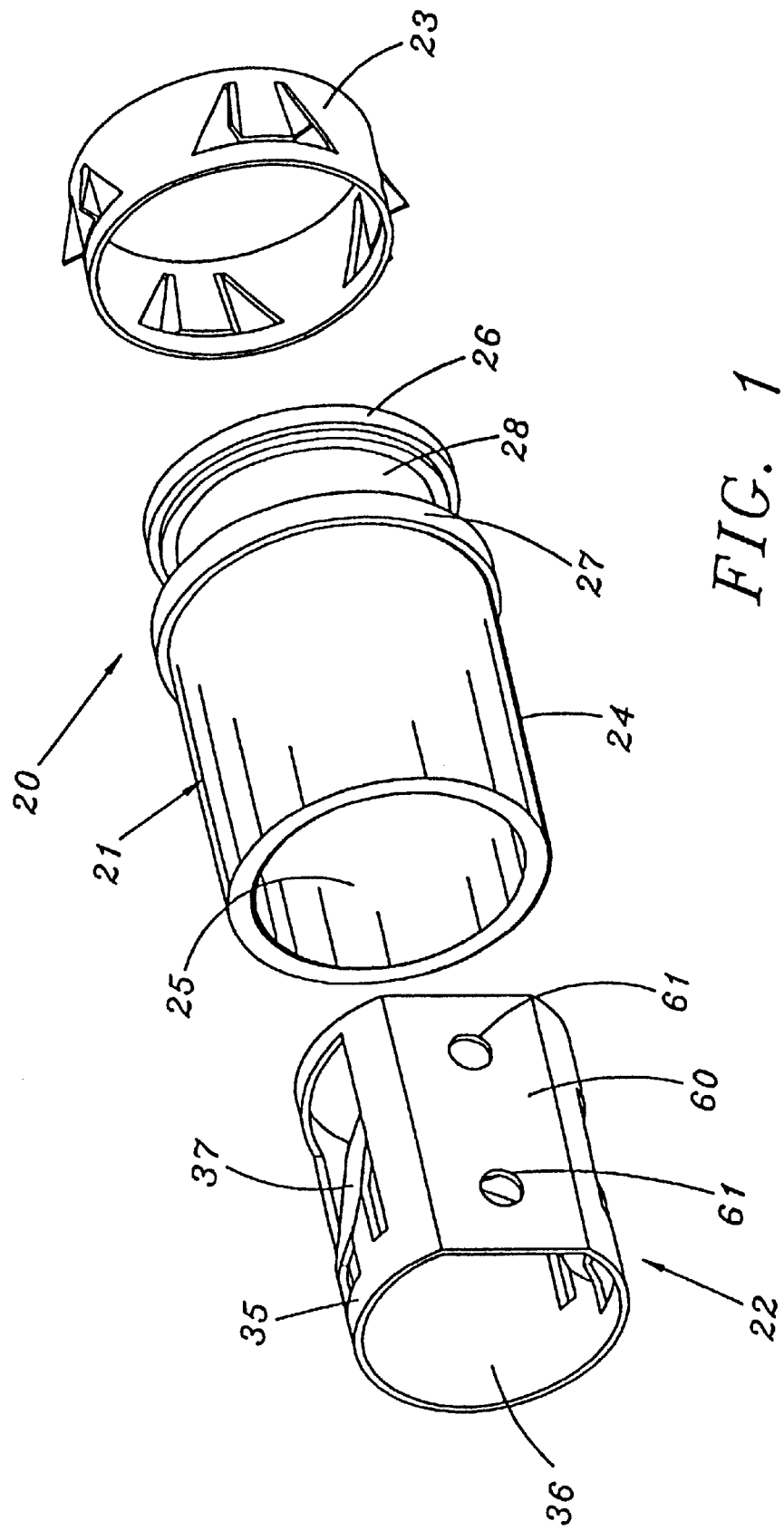
FIG. 1 is an exploded perspective view of one embodiment of a fully assembled electrical cable connector of the present invention.
Figure 3:
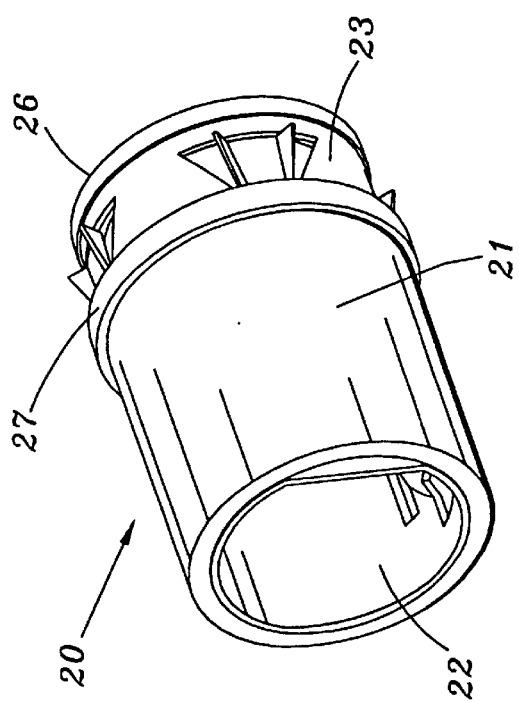
FIGS. 2 and 3 are perspective views of the fully assembled electrical cable connector of FIG. 1.

By referring to FIGS. 1–25, along with the following detailed disclosure, the construction and operation of two alternate embodiments of electrical cable connector 20 of the present inventions can best be understood. As will be evident to one having ordinary skill in this art, numerous alternate constructions may be implemented using the teaching of the present invention in addition to the embodiments shown and described herein. Consequently, it is to be understood, that all of these alternate constructions are intended to be within the scope of the present invention and the embodiments detailed herein are provided for exemplary purposes only.

As shown in FIGS. 1–4, cable connector 20 of the present invention comprises three separate and independent components, consisting of housing 21, inner sleeve member 22, and locking ring 23. In the preferred construction, housing 21 comprises a substantially hollow cylindrical shape incorporating outer surface 24, and inner surface 25. In addition, a pair of radially extending flanges 26 and 27 are formed on outer surface 24 of housing 21, with flange 27 radially extending outwardly from cylindrical surface 24 a distance greater than flange 26. Furthermore, flanges 26 and 27 are axially spaced away from each other on surface 24 in order to form therebetween a locking ring retaining zone 28.

By employing this construction, locking ring 23 is quickly and easily secured to housing 21 by positioning locking ring 23 in retaining zone 28, with locking ring 23 retained in this position by flanges 26 and 27, free from axial dislodgement.

Figure 4:
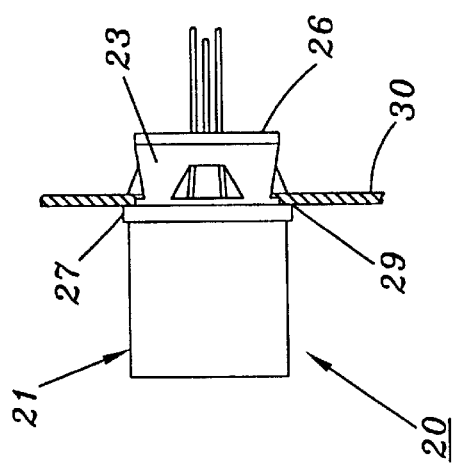
FIG. 4 is a side elevation view, partially in cross-section, depicting the electrical cable connector of FIG. 1 mounted in a conventional junction box.
Figure 2:
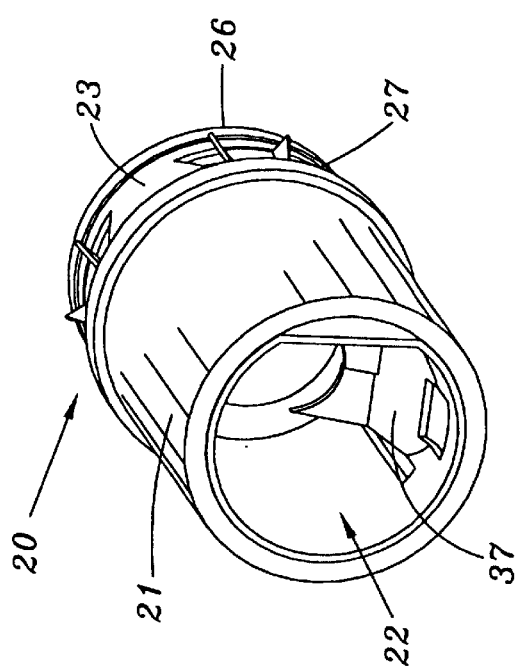
Figure 7:
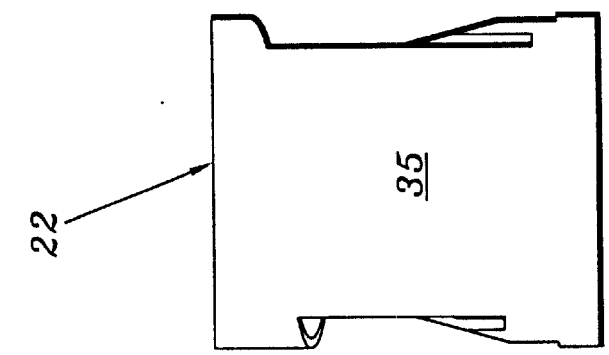
FIG. 7 is a rear elevation view of the inner sleeve member of FIG. 5.
Figure 6:
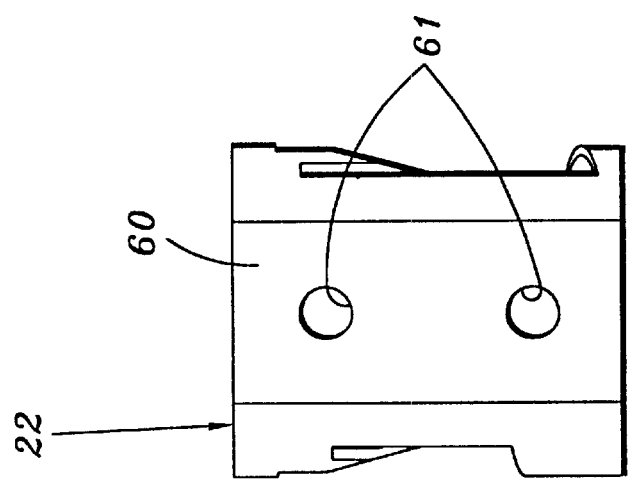
FIG. 6 is a front elevation view of the inner sleeve member of FIG. 5.
Figure 5:
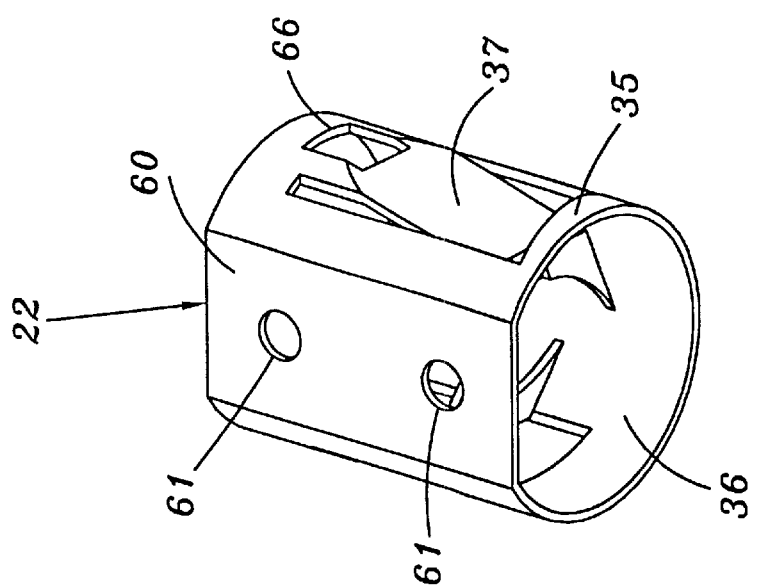
FIG. 5 is a perspective view depicting one preferred embodiment of an inner sleeve member of the cable connector of the present invention.
Figure 10:
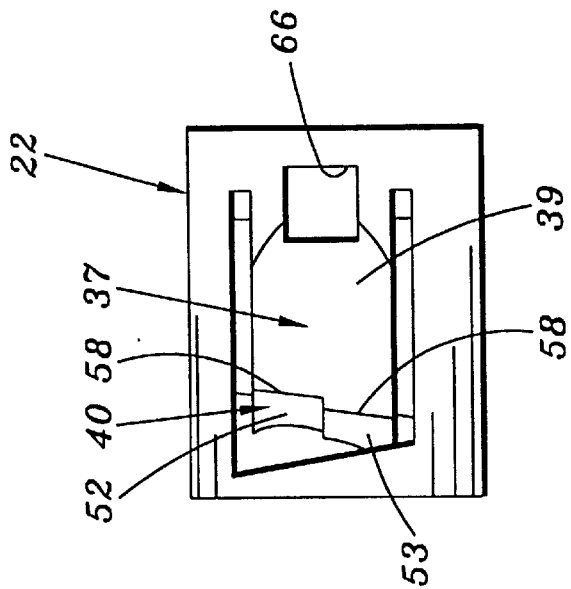
FIG. 10 is a right side elevation view of the inner sleeve member of FIG. 5.
Figure 9:
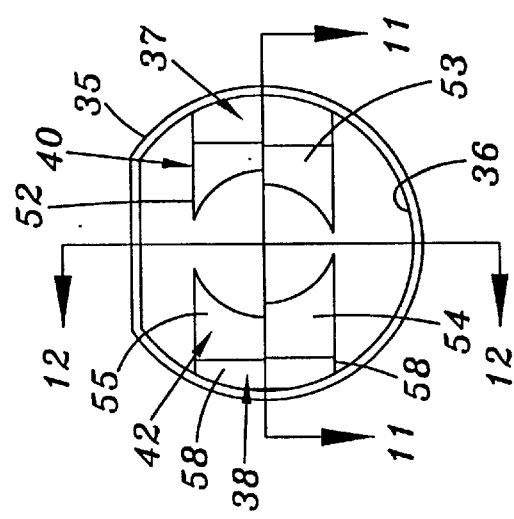
FIG. 9 is a top plan view of the inner sleeve member of FIG. 5.
Figure 8:
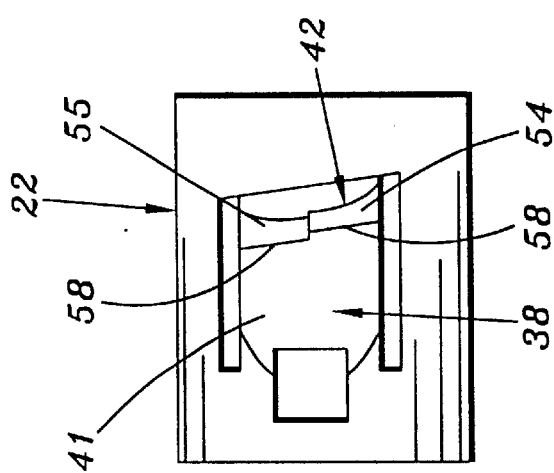
FIG. 8 is a left side elevation view of the inner sleeve member of FIG. 5.

In addition, as is well-known in the art and as shown in FIG. 4, flange 26 comprises a diameter which enables the passage of flange 26 and locking ring 23 through receiving hole 29 formed in junction box and/or outlet box 30, while flange 27 comprises a diameter greater than the diameter of receiving hole 29. In this way passage of housing 21 through receiving hole 29 of junction box and/or outlet box 30 beyond flange 27 is prevented.

Furthermore, the construction of locking ring 23 engages in junction/outlet box 30 after passage through receiving hole 29, preventing axial removal of housing 21 from junction/outlet box 30. As a result, secure, locked engagement of housing 21 with junction/outlet box 30 is provided in an easily assembled and quickly installed manner.

As fully detailed herein and shown in FIGS. 1–14, inner sleeve member 22 of cable connector 20 is constructed in a substantially hollow cylindrical shape which is defined by outer surface 35 and inner surface 36. In the preferred construction, the outer diameter of sleeve member 22, as defined by outer surface 35, is constructed substantially equivalent to the diameter of inner surface 25 of housing 21. In this way, inner sleeve member 22 is securely affixed to housing 21 by a press fit or by frictional engagement between outer surface 35 of sleeve member 22 and inner surface 25 of housing 21. The frictional interengagement established between inner sleeve member 22 and housing 21 is constructed to exceed all force requirements imposed upon cable connectors. In this way, trouble-free, secure engagement of an electrical cable with connector 20 is assured.

As is well-known in the art, other methods can be employed for providing interengagement of inner sleeve member 22 with housing 21 other than the preferred embodiment of frictional engagement. In this regard, FIGS. 15–24 disclose an alternate embodiment, wherein an alternate engagement system is employed. However, although alternate securement systems or constructions can be employed, as taught in the prior art, the preferred embodiment of the present invention employs frictional interengagement as detailed herein.

In order to provide secure, locked, movement-free engagement of any desired electrical cable with cable connector 20 of the present invention, inner sleeve member 22 is constructed in a unique manner with a plurality of cable gripping elements integrally associated therewith. By referring to the following detailed discussion, along with FIGS. 1–4, 13 and 14, wherein fully assembled cable connector 20 is disclosed and FIGS. 5–12 wherein inner sleeve member 22 is separately detailed, the construction and operation of the preferred embodiment of cable connector 20 of the present invention, with its uniquely constructed inner sleeve member 22, can best be understood.

In this preferred embodiment, inner sleeve member 22 comprises, in addition to its substantially cylindrical shape, two arm members 37 and 38 which extend inwardly from inner surface 36 of sleeve member 22. Preferably, arm member 37 is constructed with a sloping, intermediate section 39 and a sloping, end section 40. Similarly, arm member 38 comprises a sloping, intermediate section 41 and a sloping, end section 42.

Figure 11:
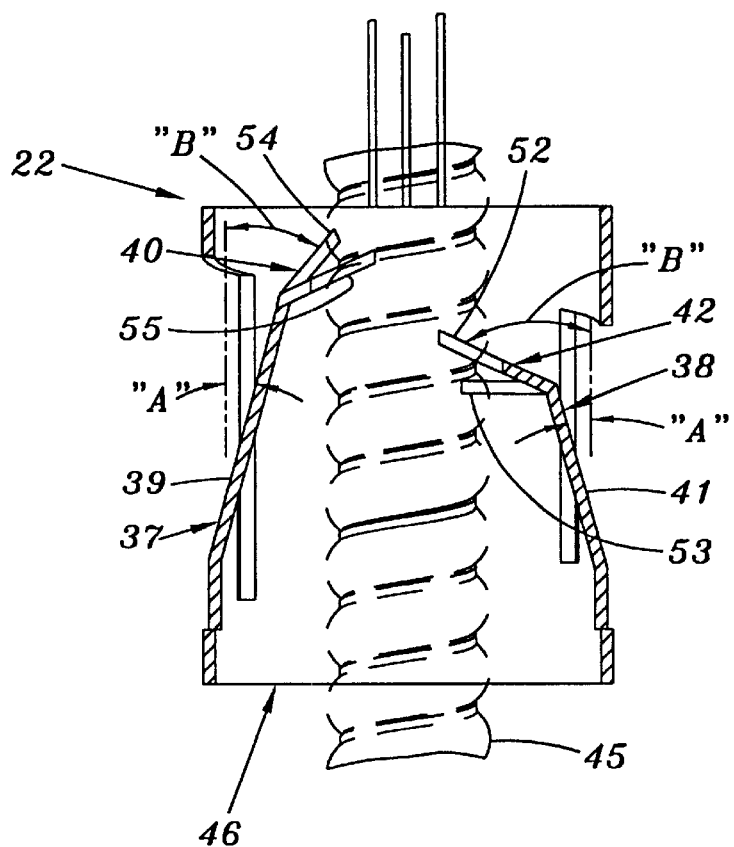
FIG. 11 is a cross-sectional side elevation view of this embodiment of the inner sleeve member taken along line 11—11 of FIG. 9.

As shown in FIG. 11, arm members 37 and 38 are constructed for securely engaging the outer surface of electrical cable 45, shown in phantom, allowing cable 45 to be easily, telescopically inserted into sleeve member 22 in the direction of arrow 46. By employing this construction, as detailed herein, axial movement of electrical cable 45 in the direction of arrow 46 is easily attained, while axial movement or withdrawal of cable 45 from sleeve member 22 in the opposite direction is prevented. Furthermore, arm members 37 and 38 are constructed to maximize engagement with cable 45 and assure secure, movement-free, locked retention of cable 45 in sleeve member 22.

One of the features incorporated into arm members 37 and 38 to provide the desired securement to electrical cable 45 is the incorporation of two separate and distinct sloping sections in each arm member. As shown in FIG. 11, intermediate section 39 of arm member 37 slopes inward away from inner surface 36, or outer surface 35, of sleeve member 22 at angle "A", while end section 40 slopes inwardly from inner surface 36 at angle "B". Similarly, intermediate section 41 of arm member 38 slopes inwardly from inner surface 36 at angle "A", while end section 42 slopes inwardly from inner surface 36 at angle "B".

In the preferred embodiment, it has been found that angle "A" preferably ranges between about 15° and 30°, while angle "B" preferably ranges between about 45° and 75°. By employing slope angles falling within these parameters, optimum engagement of cable 45 is attained and secure retention thereof is provided. Although these arcuate ranges are preferred for providing optimum performance, variations can be made without departing from the scope of this invention.

Another feature incorporated into arm members 37 and 38 of sleeve member 22 in order to enhance the secure, locked interengagement of electrical cable 45 in sleeve member 22 is the construction employed for the terminating edge of end sections 40 and 41. As depicted throughout the drawings, end section 40 of arm member 37 comprises an arcuately curved terminating edge 50, while end section 42 of arm member 38 comprises an arcuately curved terminating edge 51. In the preferred construction, terminating edges 50 and 51 comprise a radius of curvature which is substantially equal of the radius of curvature employed in forming the outer surface of electrical cable 45. As a result, terminating edges 50 and 51 are specifically constructed for directly contacting the surface of electrical cable 45 along substantially the entire arcuate length of edges 50 and 51. In this way, engagement of end sections 40 and 42 with electrical cable 45 is further enhanced.

Another unique and distinctive feature of the present invention which further enhances and optimizes the secure locked retention of electrical cable 45 is the bifurcation of end section 40 of arm member 37 into two separate and independent finger portions 52 and 53. Similarly, end section 42 of arm member 38 is also bifurcated into two separate and independent finger portions 54 and 55. As fully detailed herein, and shown throughout the drawings, the incorporation of two separate and independent finger portions as the terminating end section of each arm member 37 and 38 provides further enhanced secure, locked interengagement of arm members 37 and 38 with electrical cable 45. In order to achieve the desired separation, and offset distance of about 1/8" is preferred.

Figure 12:
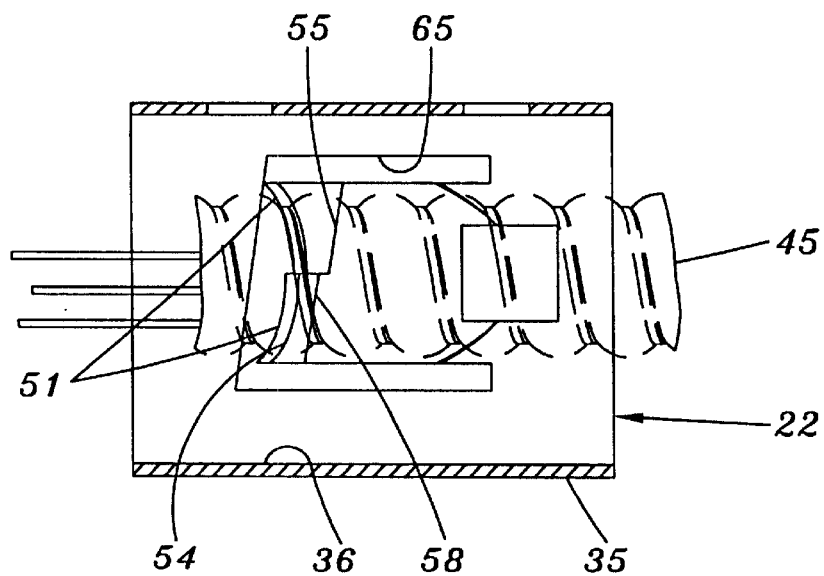
FIG. 12 is a cross-sectional side elevation view of this embodiment of the inner sleeve member taken along line 12—12 of FIG. 9.

As best seen in FIGS. 11 and 12 in the preferred construction, finger portions 52 and 53 of end section 40 extend from intermediate section 39 at different angles relative thereto. As a result, terminating edge 50 of each finger portion 52 and 53 engages electrical cable 45 at a different location on the outer surface of cable 45. In the preferred embodiment, as depicted in FIGS. 11 and 12, terminating edges 50 of finger portions 52 and 53 are constructed for engaging electrical cable 45 on opposite sides of the minor diameter or narrowed portion thereof.

Similarly, terminating edge 51 of finger portions 54 and 55 of arm member 38 also extend from intermediate section 41 at different angles relative thereto, engaging the outer surface of electrical cable 45 at different positions directly adjacent the minor diameter or narrowed portion of cable 45. In this way, secure, locked, movement-free interengagement of electrical cable 45 in sleeve member 22 is assured.

In accordance with the present invention and shown in the drawings, finger portions 52 and 53 of arm member 37 are bent inwardly relative to intermediate section 39 at the desired angles along bend line 58. In the embodiment depicted in FIGS. 8–12, bend lines 58 are formed at a slanting acute angle relative to the side walls of intermediate section 39. Similarly, finger portions 54 and 55 are bent inward late relative to intermediate section 41 along bend line 58, which is shown in FIGS. 8–12 as being slanted relative to the side edges of intermediate section 41 forming an acute angle therewith.

As is more fully detailed below, bend line 58 may comprise any desired angular relationship relative to the side edges of intermediate sections 39 and 41 without departing from the scope of the present invention. In this regard, although slanted or sloping bend lines are depicted in FIGS. 8–12, a bend line 58 is depicted in FIGS. 21–22 and 24–25, in association with alternate embodiments of the present invention, wherein the bend line is substantially perpendicular to the side edges of the intermediate section.

By constructing bend line 58 with a slope angle which matches the slope angle of the helical-shaped minor diameter or recessed zone of cable 45, more precise alignment and secure locked engagement of finger portions 52, 53, 54 and 55 with electrical cable 45 is achieved. Consequently, although not required, the incorporation of a bend line 58 which slopes or is angularly disposed relative to the side edges of the intermediate section of the arm member is preferred, with the slope angle preferably matching the slope of the helical recess or minor diameter of electrical cable 45.

A further feature incorporated into cable connector 20 of the present invention is found in the construction of the axial length of intermediate sections 39 and 41 of arm members 37 and 38 of sleeve member 22. As detailed herein, the axial length of intermediate sections 39 and 41 may be substantially equal, or may be varied relative to each other.

In the embodiment depicted in FIGS. 8–12, the axial length of intermediate section 39 of arm member 37 is shown substantially longer than the axial length of intermediate section 41 of arm member 38. By employing this construction, and otherwise forming end sections 40 and 42 of each arm member in a substantially identical manner, terminating edges 50 and 51 of arm members 37 and 38 contact electrical cable 45 at separate and distinct positions along the axial length of cable 45. In this way, arm members 37 and 38 are constructed to directly engage the minor diameter or recessed zone of electrical cable 45 at precisely desired locations along the axial length thereof, thereby assuring that both arm members 37 and 38 are each in direct, contacting engagement in the minor diameter or recessed zone of cable 45.

Figure 19:
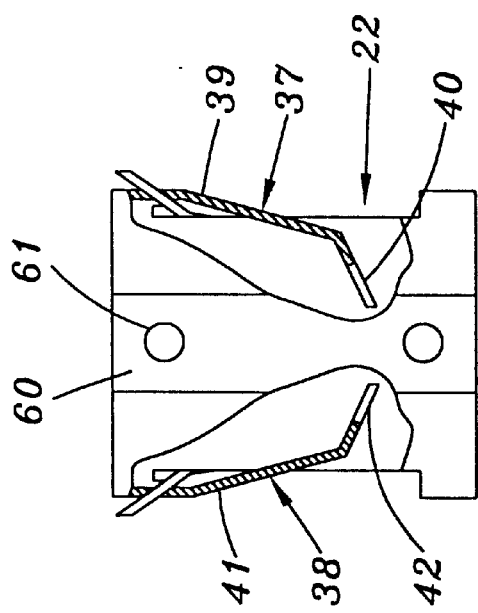
FIG. 19 is a front elevation view of the inner sleeve member of FIG. 18.
Figure 20:
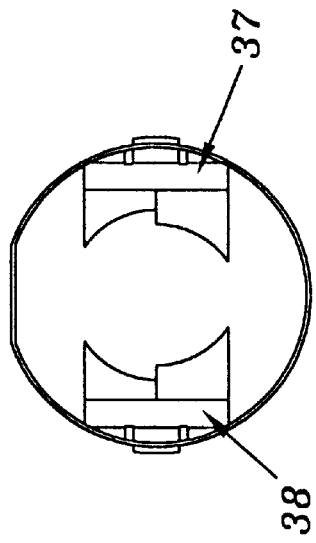
FIG. 20 is a top plan view of the inner sleeve member of FIG. 18.
Figure 21:
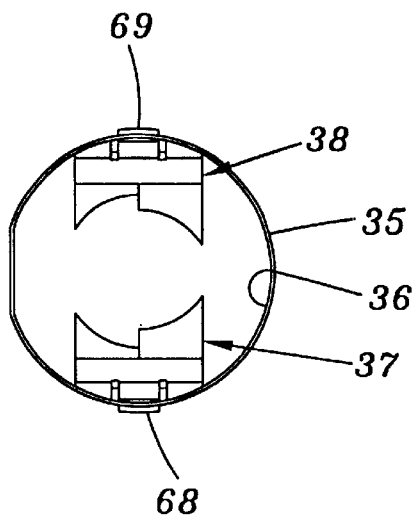
FIG. 21 is a bottom plan view of the inner sleeve member of FIG. 18.

Alternatively, as shown in FIG. 19, intermediate sections 39 and 41 of arm members 37 and 38 may be constructed with substantially equivalent axial lengths, thereby engaging electrical cable 45 at substantially identical axial locations, substantially diametrically opposed from each other. Depending upon the construction of electrical cable 45, having each arm member 37 and 38 engaging electrical cable 45 at substantially the identical, diametrically opposed position can be desirable and can provide optimum, secure and locked engagement of cable 45. This is particularly true with cable constructions incorporating annular, ring-shaped recessed zones which are substantially parallel to each other.

As detailed above, the embodiment of cable connector 20 depicted in FIGS. 1–14 is constructed with inner sleeve member 22 comprising an outer diameter defined by outer surface 35 which is configured to assure secure, frictional interengagement between sleeve member 22 and inner surface 25 of housing 21. In this way, as previously discussed, once inner sleeve member 22 is inserted into housing 21, a substantially integral cable connector 20 is formed with sleeve member 22 being securely frictionally engaged and retained in housing 21.

In order to assist in the positioning and insertion of inner sleeve member 22 in housing 21, sleeve member 22 incorporates a substantially flat or planer surface 60 formed on otherwise cylindrically shaped sleeve member 22. In addition, apertures 61 are also formed on planer surface 60, for assisting in the assembly process. However, the incorporation of apertures 61 as well as in the construction of sleeve member 22 with substantially flat surface 60 may be eliminated, without departing from the scope of this invention.

In addition to employing the press fit or friction fit engagement of inner sleeve member 22 with housing 21, inner sleeve member 22 may be securely mounted to housing 21 using a plurality of alternate constructions. One such alternate construction is depicted in FIGS. 15–23 wherein the use of locking tabs is employed.

As is well known to those having ordinary skill in this art, the use of locking tabs to secure a sleeve members with a housing has been employed in a wide variety of alternate constructions. However, as depicted in FIGS. 15–23, the present invention employs a unique construction for producing an easily manufactured and readily installed sleeve member incorporating locking tabs for mounted engagement with a housing.

Figure 15:
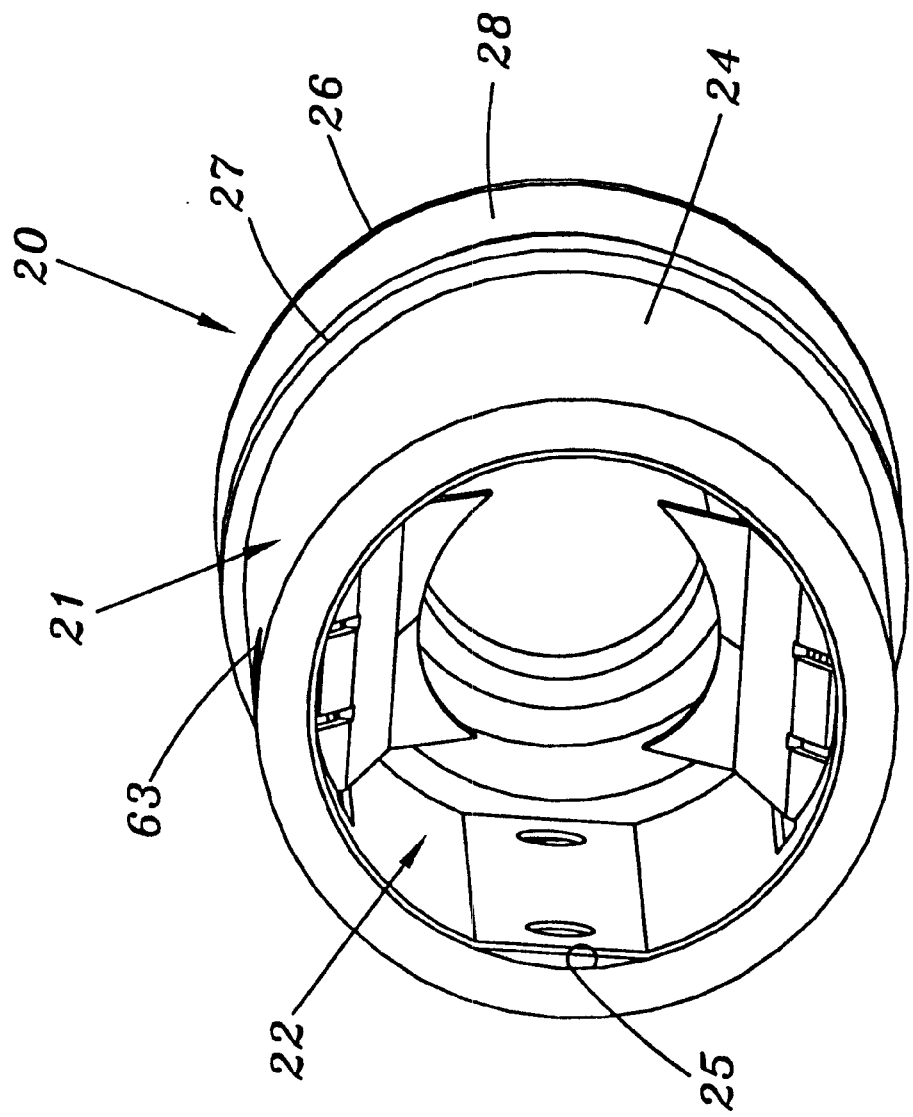
FIG. 15 is a perspective view of an alternate embodiment of a fully assembled electrical cable connector of the present invention with the retaining ring removed therefrom.
Figure 16:
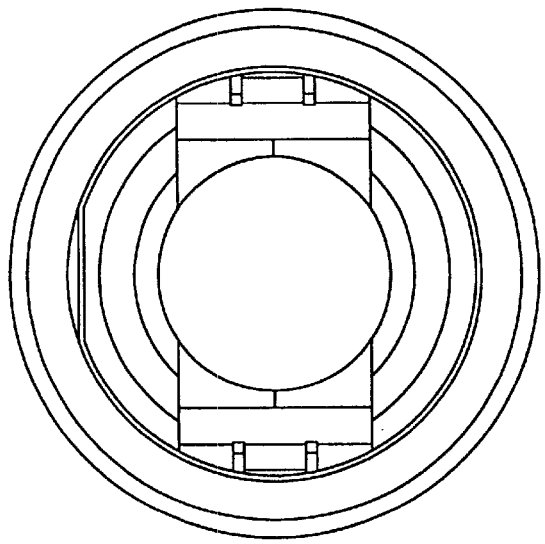
FIG. 16 is a top plan view of the fully assembled electrical cable connector of FIG. 15.
Figure 17:
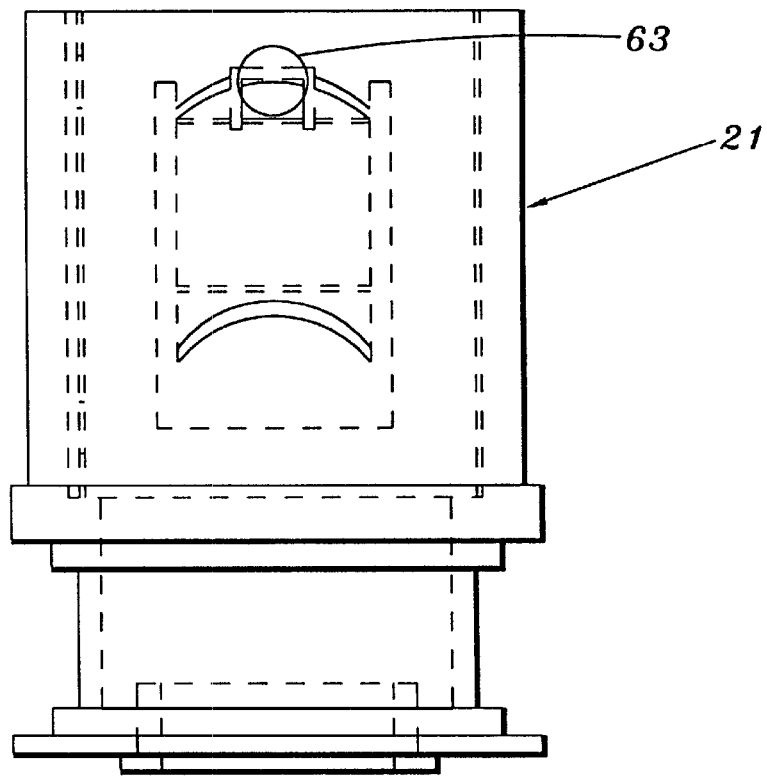
FIG. 17 is a side elevation view of the fully assembled electrical cable connector of FIG. 15.
Figure 18:
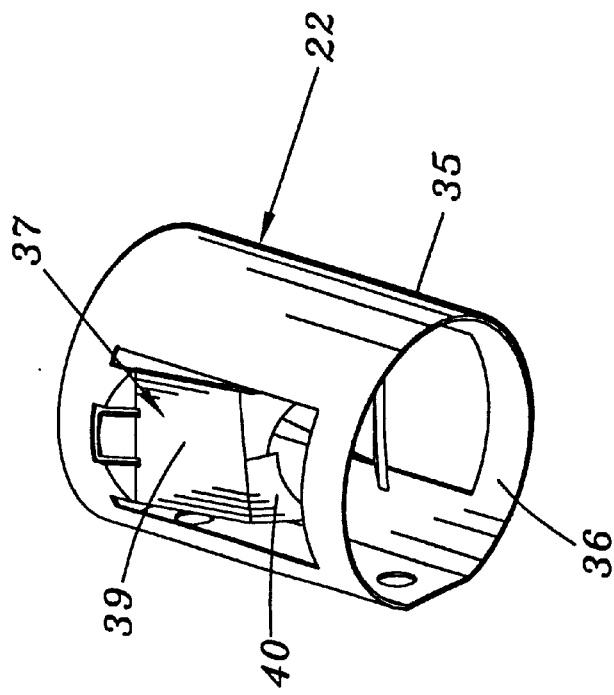
FIG. 18 is a perspective view of an alternate embodiment of an inner sleeve member incorporated into the cable connector of the present invention.

As shown in FIGS. 15–17, housing 21 of cable connector 20 is constructed in a manner substantially identical to the construction detailed above, with housing 21 comprising a substantially hollow, cylindrical shape incorporating outer surface 24, inner surface 25, and two, axially spaced, radially extending flanges 26 and 27. In addition, flange 27 radially extends outwardly from cylindrical surface 24 a distance greater than flange 26, defining therebetween locking ring retaining zone 28.

As detailed above, although not shown in FIGS. 15–17, locking ring 23 depicted in FIGS. 1–4 is employed in the identical manner detailed above, by being positioned in retaining zone 28 for use in securely retaining cable connector 20 in a receiving hole formed in an outlet box or junction box to which cable connector 20 is mounted. In order to avoid redundancy, it should be understood that all of the detailed discussion provided above regarding the locked interengagement between cable connector 20 in any desired outlet box or junction box is equally applicable to this alternate embodiment and this disclosure is incorporated herein by reference.

The principal variation between this embodiment of housing 21 and the embodiment detailed above is the incorporation of two apertures 63 and 64 formed in housing 21, and extending between outer surface 24 and inner surface 25. As fully detailed herein, apertures 63 and 64 are employed for receiving and securely retaining the locking tabs formed on sleeve member 22.

By referring to FIGS. 19–23, along with the following detailed disclosure, the preferred construction of this alternate embodiment of sleeve member 22 can best be understood. In this embodiment, as with the previous embodiment detailed above, sleeve member 22 comprises a substantially hollow, cylindrical shape which is defined by outer surface 35 and inner surface 36. In addition, in the preferred construction, substantially flat surface 60 and apertures 61 are also incorporated in sleeve member 22 for ease of assembly.

Inner sleeve member 22 also incorporates two diametrically opposed arm members 37 and 38 which are preferably formed from the substantially cylindrically shaped housing forming sleeve member 22 with arm members 37 and 38 extending inwardly from inner surface 36 of sleeve member 22. As detailed above, arm member 37 is preferably constructed with sloping, intermediate sections 39 and sloping, end sections 40. Similarly, arm member 38 is constructed preferably comprising sloping, intermediate section 41 and sloping, end section 42.

Although arm members 37 and 38 may be constructed using a variety of alternate methods, the preferred embodiment of inner sleeve member 22 comprises cutting two substantially U-shaped openings 65 in the wall of sleeve member 22 extending from outer surface 35 to inner surface 36 and defining thereby arm members 37 and 38. Then, by bending the resulting arm members 37 and 38 in the appropriate locations, arm member 37 is constructed with sloping intermediate section 39 and sloping end section 40, while arm member 38 is constructed comprising sloping intermediate section 41 and sloping end section 42.

In order to ease the bending of intermediate sections 39 and 41 of arm members 37 and 38 relative to outer surface 35 of the sleeve member 22, an aperture is formed at the base of intermediate sections 39 and 41 at the juncture with outer wall 35. In the embodiment of inner sleeve member 22 best seen in FIGS. 8 and 10, aperture 66 is formed in outer surface 35 extending through to inner surface 36. Although any configuration may be employed, aperture 66 is depicted as a substantially square shaped aperture.

Figure 22:
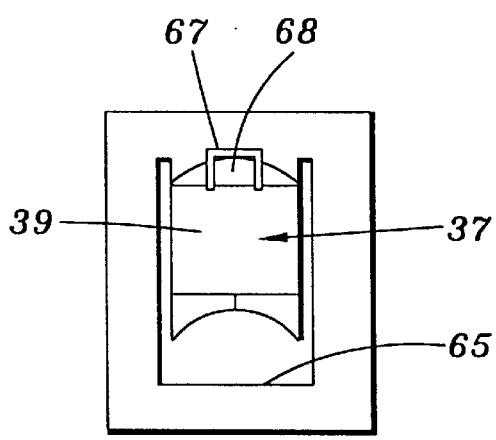
FIG. 22 is a side elevation view of the inner sleeve member of FIG. 18.
Figure 23:
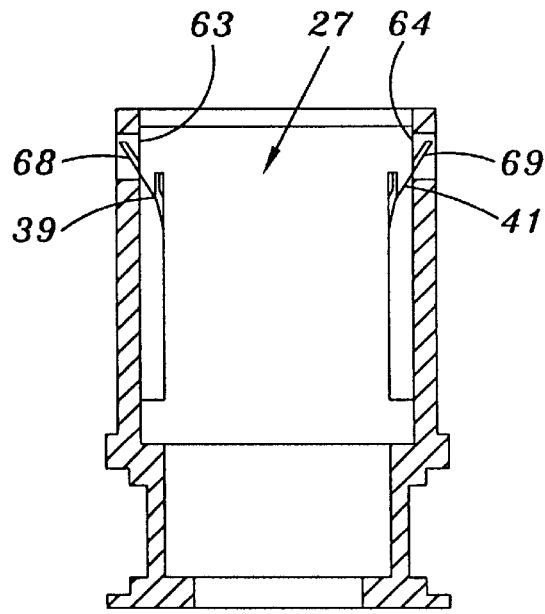
FIG. 23 is a rear elevation view, partially in cross-section, depicting the inner sleeve member of FIG. 18 in mounted engagement with the housing to form this embodiment of the electrical cable connector.

In the second, alternate embodiment of inner sleeve member 22, a U-shaped aperture 67 is formed in outer surface 35 of sleeve member 22 extending through to inner surface 36 thereof, as best seen in FIG. 22. By employing a U-shaped aperture in sleeve member 22, extension tab 68 is formed thereby, extending from the proximal end of intermediate section 39 of arm member 37.

In addition, when intermediate section 39 of arm member 37 is arcuately pivoted inwardly to achieve the desired slope angle relative to inner surface 36, tab 68 arcuately pivots in the opposite direction, extending outwardly from outer surface 35 of sleeve member 22. In this way, tab 68 is quickly and easily constructed, radially extending outwardly from outer surface 35 of sleeve member 22, in a simple, one-step operation which is achieved simultaneously with the formation of inwardly sloping intermediate section 39.

By employing a substantially identical construction, extending tab 69 is formed at the proximal end of intermediate section 41 of arm member 38, and configured to radially extend outwardly from outer surface 35 of sleeve member 22 simultaneously during the formation of an inwardly sloping intermediate section 41 of arm member 38. As a result of this construction, radially extending locking tabs 68 and 69 are formed and automatically positioned in the precisely desired location during the formation and positioning of arm members 37 and 38, ready for securely engaging and lockingly retaining the electrical cable.

During the assembly of this embodiment of cable connector 20, inner sleeve member 22 is telescopically inserted into housing 21 until radially extending locking tabs 68 and 69 are brought into engagement in apertures 63 and 64 of housing 21. Once tab 68 and 69 are secured in apertures 63 and 64, sleeve member 22 is retained in housing 21 in a manner which prevents sleeve member 22 from being withdrawn or removed from housing 21. Once in this position, cable connector 20 is fully assembled and ready for use.

Figure 24:
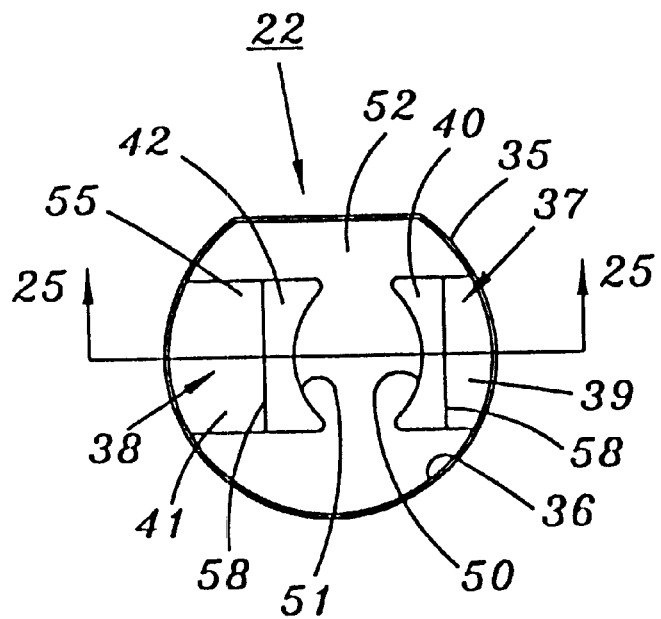
FIG. 24 is a top plan view of a further alternate embodiment for the inner sleeve member of the present invention.
Figure 25:
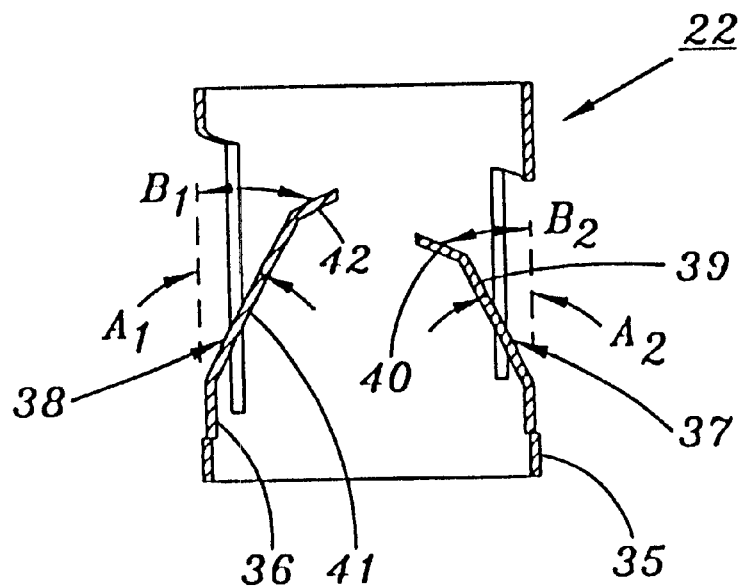
FIG. 25 is a cross-sectional side elevation view of the inner sleeve member of FIG. 24, taken along line 25—25 of FIG. 24.

In FIGS. 24 and 25, a further alternate embodiment for inner sleeve member 22 of cable connector 20 is depicted. In this embodiment, inner sleeve member 22 incorporates two diametrically opposed arm members 37 and 38 formed from the substantially cylindrically shaped housing of sleeve member 22, as detailed above, with arm members 37 and 38 extending inwardly from inner surface 36 of sleeve member 22. In addition, as detailed above, arm member 37 is constructed with sloping, intermediate section 39 and sloping end section 40, while arm member 38 is constructed with sloping, intermediate section 41 and sloping, end section 42.

In this embodiment of the present intervention, sloping end sections 40 and 42 are not bifurcated, as detailed above in connection with alternate embodiments of the present intervention. As a result, sloping end sections 40 and 42 are uniform throughout their width, lockingly engaging a cable member as a single unit, when a cable member is inserted therebetween. Furthermore, bend lines 58 formed between intermediate section 39 and end section 40, as well as intermediate section 41 and end section 42 are preferably constructed, in this embodiment, as substantially perpendicular to the side edges of the respective arm members. In this way, substantially horizontal engagement with the cable member is achieved.

In order to further enhance the engagement of sloping end sections 40 and 42 with a cable member, end section 40 of arm member 37 comprises an arcuately curved terminating edge 50 constructed for securely engaged the curved surface of the cable member. Similarly, end section 42 of arm member 38 comprises an arcuately curved terminating edge 51 similarly constructed for securely engaging the curved outer surface of the cable member.

By employing this construction, terminating edges 50 and 51 are constructed for directly contacting the surface of the electrical cable along substantially the entire arcuate length of edges 50 and 51. In this way, engagement of end section 40 and 42 with the electrical cable is enhanced.

A further feature incorporated into this embodiment of the present invention is rounding of the corners between terminating edges 50 and the side edges of end section 40, while also rounding the corners between terminating edge 51 and the side edges of end section 42. It has been found that this construction provides enhanced ease of assembly of the cable member in sleeve member 22.

As discussed above, one of the features incorporated into arm members 37 and 38 to provide the desired securement of an electrical cable therewith is the incorporation of two separate and distinct sloping sections in each arm member. In this embodiment, the sloping construction is further enhanced by providing different slope angles for each intermediate section of each arm member, as well as providing different slope angles for each end section of each arm member.

As clearly depicted in FIGS. 24 and 25, in this embodiment, intermediate section 39 of arm member 37 slopes inwardly from inner surface 36, or outer surface 35, of sleeve member 22 at an angle designated "$A_2$", while intermediate section 41 of arm member 38 slopes inwardly from surface 36 of sleeve member 22 at an angle designated "$A_1$". Furthermore, end section 40 of arm member 37 slopes inwardly from inner surface 36 of sleeve member 22 at an angle designated "$B_2$", while end section 42 of arm member 38 slopes inwardly from inner surface 36 of sleeve member 22 at an angle designated "$B_1$".

By employing this construction, arm members 37 and 38 are off-center within sleeve member 22, with arm member 37 being positioned close to inner surface 36 of sleeve member 22, while arm member 38 extends inwardly into sleeve member 22 a substantially greater extent than arm member 37, being substantially spaced away from inner surface 36. As a result, arm member 37 is substantially rigid and inflexible, while arm member 38 is substantially more flexible, and capable of being pivoted through greater arcuate distances. In this way, sleeve member 22 of this embodiment is able to accommodate electrical cables having substantially varied diameters, with the arcuate flexibility of arm member 38 accommodating different cable dimensions while enabling each cable, regardless of its diameter, to be securely mounted in captured engagement with arm members 37 and 38.

In addition to employing different slope angles for each section of each arm member, this embodiment of the present invention also employs different overall lengths for intermediate sections 39 and 41. As clearly depicted in FIG. 3, intermediate section 41 of arm member 38 comprises a substantially greater length than intermediate section 39 of arm member 37. As a result of this construction, the arcuate pivotabilty of arm member 38 is enhanced while the rigid, generally immovable construction of arm member 37 is further assured.

As is evident from the foregoing detailed disclosures, the present invention is capable of being manufactured in numerous alternate embodiments, with each alternate embodiment incorporating a wide variety of alternate construction details. However, as is clearly evident to one having ordinary skill in this art, the various construction details can be freely employed with any other embodiment, thereby further increasing the possible alternate constructions for the present invention which come within the scope of this discovery. Consequently, it is to be understood that the various embodiments detailed herein, along with the construction details thereof, are all provided for exemplary purposes, and that alternate combinations of features, elements, an arrangement of parts and components can be achieved without departing from the scope of this invention.

It will thus be seen that the object set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electrical connector for securely engaging and mounting an electrical cable to a receiving box or plate having an aperture formed therein, said electrical connector comprising:

A. a housing having
    a. a generally hollow cylindrical shape defined by an outer wall and an inner wall,
    b. at least one flange mounted about the outer wall of the housing, radially extending outwardly therefrom, and comprising a diameter greater than the diameter of the aperture formed in the receiving box/plate;
  B. a locking member mounted to the outer wall of the housing in cooperating engagement with the radially extending flange thereof for securing the housing in the aperture of the box/plate; and
  C. an inner sleeve member comprising:
    a. a substantially hollow, substantially cylindrical shape, having any inner surface and an outer surface, dimensioned for mating, fractional engagement with the inner wall of the housing to form a substantially integral construction therewith, and
    b. a pair of arm members extending inwardly from the inner surface of the sleeve member, with each of said arm members comprising a first, intermediate sloping section extending from the sleeve member and a second, sloping, end section extending from the intermediate section at an angle relative thereto and positioned for mating engagement and securement with an electrical cable when inserted therein;

whereby an electrical connector is achieved which is quickly and easily mounted to any desired box or plate and provides secure, mating, locked engagement with said electrical cable when mounted therewith.

2. The electrical connector defined in claim 1, wherein said electrical cable comprises a curved outer surface and the end section of each of said arm members is further defined as comprising a curved terminating edge constructed for mating, engaged relationship with the surface of the electrical cable.

3. The electrical connector defined in claim 2, wherein the end section of each of said arm members is further defined as being bifurcated to create two separate and independent finger members formed therein.

4. The electrical connector defined in claim 3,wherein each of said separate and independent finger members formed on the end section of each of said arm members comprises different angular relationships relative to an intermediate section.

5. The electrical connector defined in claim 2, wherein each of said arm members is further defined as comprising side edges formed in juxtaposed, spaced, parallel relationship with each other, and the intermediate section is defined as extending inwardly from the sleeve member along a first bend line defining a first angle relative to the inside surface of the inner sleeve member, and the terminating end section is further defined as sloping inwardly along a second bend line defining a second angle relative to the inside surface of the inner sleeve member.

6. The electrical connector defined in claim 5, wherein said second bend line is further defined as being sloped relative to the side edges of each of the arm members.

7. The electrical connector defined in claim 6, wherein said electrical cable is further defined as comprising a metal sheath cable or conduit having a sloping helical groove formed therein, and the slope of the second bend line is further defined as being formed substantially equivalent to the slope of the helical groove for assuring secure, mating, interengagement of the terminating end section with the surface of the cable.

8. The electrical connector defined in claim 5, wherein said second bend line is further defined as being substantially perpendicular to the side edges of each of the arm members.

9. The electrical connector defined in claim 5, wherein said first angle is further defined as ranging between about 15° and 38°.

10. The electrical connector defined in claim 5, wherein said second angle is further defined as ranging between about 45° and 75°.

11. The electrical connector defined in claim 1, wherein the intermediate section of each of said arm members of the inner sleeve member is further defined as comprising different axial lengths, whereby said arm members engage the electrical cable at different axial positions thereof.

12. The electrical connector defined in claim 1, wherein the intermediate section of each arm member of the inner sleeve member is further defined as comprising substantially equivalent axial lengths, whereby said arm members engage the electrical cable at substantially equivalent, diametrically opposed positions.

13. The electrical cable defined in claim 1, wherein said inner sleeve member comprises a substantially flat wall portion integrally formed therein and longitudinally extending along substantially the entire surface thereof, for use in positioning the inner sleeve member in the desired orientation in the housing.

14. The electrical cable defined in claim 1, wherein each of said arm members are further defined as comprising a tab member formed at the juncture between the intermediate section and the sleeve member, with said tab member extending radially outwardly from the inner sleeve member.

15. The electrical cable defined in claim 14, wherein said housing is further defined as comprising apertures formed therein positioned for cooperative association and engagement with the tab members of the inner sleeve, thereby preventing axial movement of the inner sleeve relative to the housing.

16. The electrical cable defined in claim 14, wherein said tab member is formed as an integral part of the intermediate section and constructed for extending outwardly from the juncture of the intermediate section with the inner sleeve simultaneously with the movement of the intermediate section arcuately inwardly.

17. An electrical connector for securely engaging and mounting an electrical cable to a receiving box or plate having an aperture formed therein, said connector comprising:

A. a housing having
  a. a generally hollow cylindrical shape defined by an outer wall and an inner wall,
  b. at least one flange mounted about the outer wall of the housing, radially extending outwardly therefrom, and comprising a diameter greater than the diameter of the aperture formed in the receiving box/plate;
B. a locking member mounted to the outer wall of the housing in cooperating engagement with the radially extending flange thereof for securing the housing in the aperture of the box/plate; and
C. an inner sleeve member comprising:
  a. a substantially hollow, substantially cylindrical shape, having any inner surface and an outer surface, dimensioned for mating, fractional engagement with the inner wall of the housing to form a substantially integral construction therewith, and
  b. a pair of arm members extending inwardly from the inner surface of the sleeve member, with each of said arm members comprising:
    1. a first, intermediate sloping section extending inwardly from the sleeve member along a first bend line defining a first angle relative to the inside surface of the sleeve member,
    2. a second, sloping, end section angularly extending from the intermediate section, sloping inwardly along a second bend line defining a second angle relative to the inside surface of the sleeve member, and positioned for mating engagement and securement with an electrical cable when inserted therein, and
    3. side edges formed in juxtaposed, spaced relationship with each other;

whereby an electrical connector is achieved which is quickly and easily mounted to any desired box or plate and provides secure, mating, locked engagement with said electrical cable member when mounted therewith.

18. The electrical connector defined in claim 17, wherein the terminating end section of each of said arm members is further defined as comprising a curved terminating edge constructed for mating, engaged relationship with the outer surface of the electrical cable.

19. The electrical connector defined in claim 18, wherein the first angle is further defined as ranging between about 15° and 38°.

20. The electrical connector defined in claim 18, wherein the first angle of the intermediate sloping section of each of said arm members comprises a different angle relative to the other arm member, thereby enabling cables of different diameters to be easily inserted and secured therein.

21. The electrical connector defined in claim 20, wherein the second angle is further defined as ranging between about 45° and 75°, with the second angle of each of said arm members being different from the other.

22. The electrical connector defined in claim 21, wherein the terminating juncture directly adjacent the side edge of each of said arm members and the arcuately curved terminating edge of each section is further defined as being smoothly rounded.

* * * * *